C. F. WYATT.
RIDGER AND BLOCKER.
APPLICATION FILED JAN. 22, 1917.

1,238,616.

Patented Aug. 28, 1917.
2 SHEETS—SHEET 1.

Inventor
Clayton F. Wyatt
by Hazard & Miller
Att'ys.

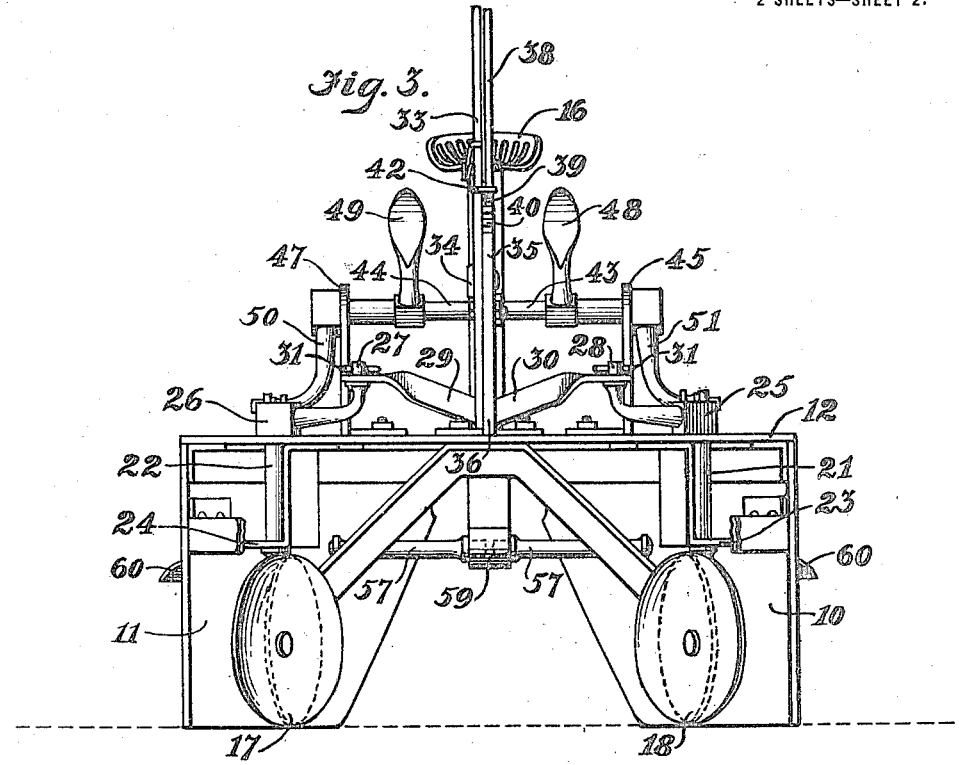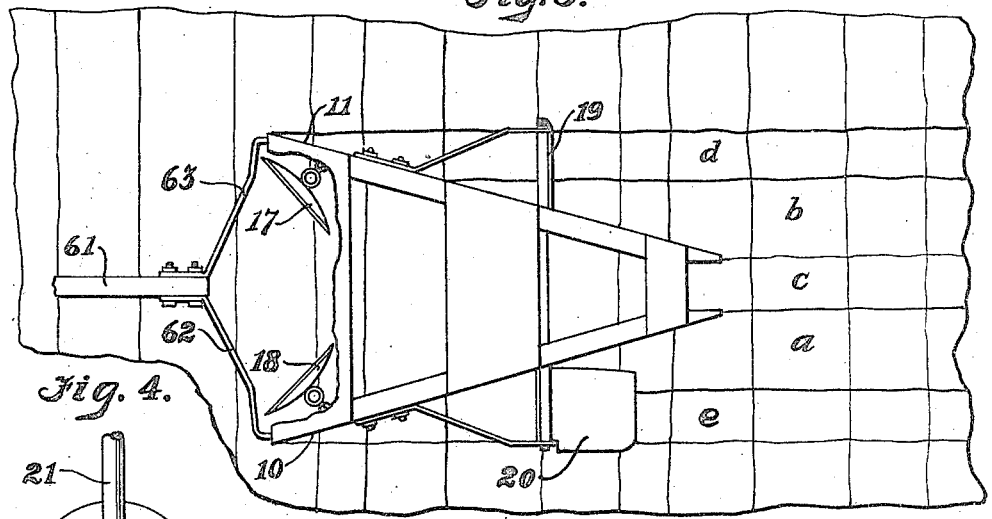

UNITED STATES PATENT OFFICE.

CLAYTON F. WYATT, OF FULLERTON, CALIFORNIA.

RIDGER AND BLOCKER.

1,238,616.      Specification of Letters Patent.      Patented Aug. 28, 1917.

Application filed January 22, 1917. Serial No. 143,808.

*To all whom it may concern:*

Be it known that I, CLAYTON FRANK WYATT, a citizen of the United States, residing at Fullerton, in the county of Orange and State of California, have invented new and useful Improvements in Ridgers and Blockers, of which the following is a specification.

This invention relates to an agricultural implement and particularly pertains to a ridger and blocker to be used in farm irrigation work.

In the farm districts where it has been found necessary to irrigate the farm land, various methods have been used to form the irrigation ditches throughout the ground under cultivation and to check the land so that the flow of water will be along continuous defined courses of travel. This preliminary irrigation work has been attended with many difficulties and it is the principal object of this invention to provide a machine for forming the irrigation ditches and ridges therebetween as well as to check the ditches at required points.

Another object of this invention is to provide an implement of the above class which affords means for increasing or decreasing the height of ridge between the ditches in an adjustable manner.

Another object of this invention is to provide means for selectively blocking the lateral ditches as the implement passes across them at an angle.

A further object of this invention is to provide an agricultural implement for use in irrigation purposes which will be formed as a self-contained unit and of a substantial construction and may be operated by the driver without other assistance.

Other objects will appear hereinafter.

The invention is illustrated, by way of example, in the accompanying drawings in which:

Fig. 3 is a view in elevation as seen looking into the forward end of the implement and disclosing the adjustable ridgers and their pivotal mounting.

Fig. 4 is a detail view illustrating in a fragmentary manner the vertical adjustment provided the disk ridging members.

Fig. 5 is a view in diagram illustrating the manner in which the implement performs its work.

Figure 1:
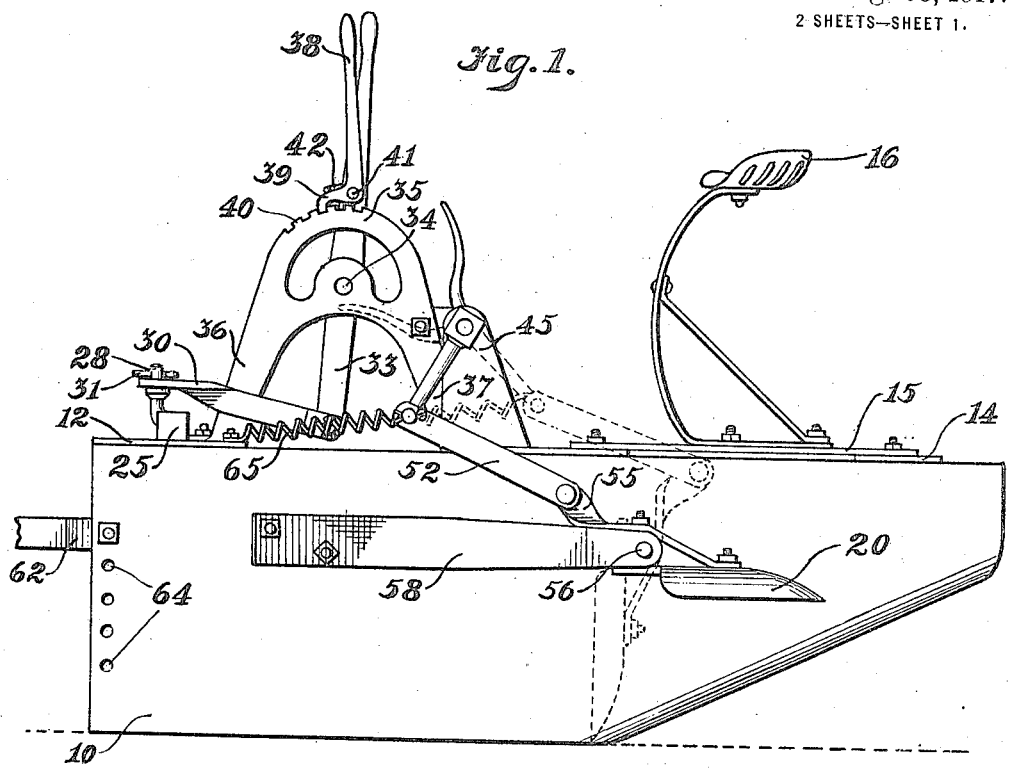
Figure 1 is a view in side elevation illustrating the completely assembled implement.
Figure 2:
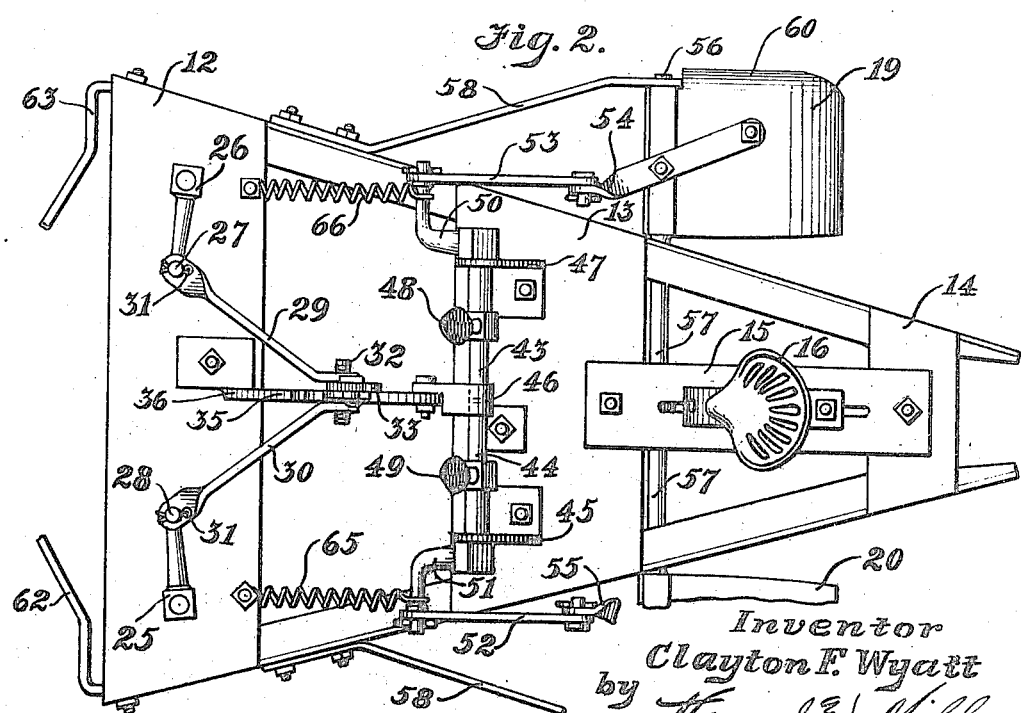
Fig. 2 is a view in plan of the implement disclosed in Fig. 1 and with a portion of one of the blockers broken away for convenience.

Referring more particularly to the drawings, 10 and 11 indicate the side boards of the implement. These members are vertically disposed and substantially converge at the rear end of the machine where the lower edge of each member is beveled upwardly to allow clearance for the soil forming the ridge, as will hereafter be described. The side boards are held together by means of a horizontal platform member 12 fixed at the forward end of the implement, a central platform 13, and a rear cross brace 14. A longitudinally extending brace member 15 is fixed upon the cross members 13 and 14 and provides a support for a seat 16.

The operative mechanism of the implement consists in disk ridging members 17 and 18 and blocking scrapers 19 and 20. The ridging members are disposed between the side boards and adjacent their forward ends and are mounted for horizontal pivotal movement upon disk shafts 21 and 22. These shafts extend upwardly through suitable bearings 23 and 24 and project through the horizontal platform member 12 where they are supplied with crank arms 25 and 26. These arms are fixed to the upper end of the shafts 21 and 22 and extend inwardly toward each other. The adjacent ends of the arms are up-turned and are fitted with vertical studs 27 and 28 upon which are mounted the forward ends of drag links 29 and 30. These links are held in place upon the studs by means of cotter pins 31 and thereafter are connected at their opposite ends upon a horizontally disposed pin 32 which extends through the lower end of a lever arm 33 by which the movement of the cranks is controlled. The lever arm 33 extends upwardly at a point along the longitudinal axis of the implement and is pivotally mounted upon a pin 34 secured to a ratchet sector 35. The sector 35 is provided with downwardly extending legs 36 and 37 which are bolted to the platform members 12 and 13, respectively. The lever 33 is provided with a handle and a locking grip 38 which is fitted with a dog 39 adapted to be brought into engagement with a series of ratchet teeth 40. The dog and grip are mounted upon a pivot pin 41 on the lever and are held in position against the ratchet by means of a spring 42. It will thus be seen that vertical swinging movements of the lever will act to swing the disks 17 and 18 at equal angles to each other and thus control the formation of the ridge made by the machine.

The blocking mechanism by which blocking scrapers 19 and 20 are controlled consists of horizontally disposed rock-shafts 43 and 44 which are in longitudinal alinement with each other and are mounted within bearings 45, 46 and 47 secured upon the central platform 13. The shaft 43 is provided with a foot-pedal 48 and shaft 44 is provided with a foot-pedal 49 by which each shaft may be rotated within its bearings. The outer ends of the shafts are provided with crank arms 50 and 51, respectively, to which side links 52 and 53 are pivotally secured. These links extend rearwardly along the sides of the boards 10 and 11 and connect with actuating arms 54 and 55 fixed to the scrapers 19 and 20, respectively. These arms are adapted to swing the scrapers throughout a vertical plane and upon trunnions 56 and 57 with which each of the scrapers is provided. The trunnion 56 extends outwardly from each scraper and is mounted within a side bracket 58, while the trunnions 57 extend inwardly and are rotatably secured within a common central bearing 59. In this manner the scrapers may be directly actuated by the foot-pedals and may be swung downwardly so that their longitudinally curved blades and arcuately disposed end portions 60 will engage the soil and scrape it from the ridges to check the lateral ditches.

In operation, the implement is drawn by means of a tongue 61 which is pivotally secured by fork members 62 and 63 to the forward ends of the side boards. A series of vertically alined openings 64 are provided in each side board to permit the tongue to be adjusted. As the implement is drawn forward through the loose soil, the side boards will throw the soil inwardly and as the boards converge the soil will be ridged upwardly to form a ridge having sides —a— and —b—, as indicated in Fig. 5, and a top plane —c—. The angularity of this ridge will be, to a great extent, determined by the bevel of the side boards at their rear ends. As a means for aiding the side boards in ridging the dirt, the ridging disks 17 and 18 are utilized and canted at equal angles to each other, as desired, to throw the dirt upwardly into the center of the ridge and relieve the load produced by the dragging of the side boards. The horizontal lower edge of the side boards will form the bottom of the ditch, as indicated by letters —d— and —e— in Fig. 5, and thus act to form a complete ditch with a proper ridge as the implement is drawn across a field under cultivation. It is customary to arrange these ditches in checkered fashion and to block certain of the laterals to establish a proper flow of water and irrigation. This is done in the present machine by the blocking scrapers 19 and 20 which are secured to the outer sides of the members 10 and 11. When a ditch is being formed transversely of a previously formed lateral ditch and it is desired to obstruct the lateral ditch, the pedals 48 and 49 are depressed as desired and they in turn will swing the scrapers 19 and 20 downwardly in a manner to throw soil across the mouth of the lateral ditch and obstruct it, after which the scraper may be released and will be restored to its normal position by means of coil springs 65 and 66.

It will thus be seen that the irrigating implement here provided may be operated by the driver without assistance and will readily form ditches and properly check them as desired.

While I have shown the preferred construction of my ridging and blocking implement as now known to me, it will be understood that various changes in the combination, construction and arrangement of parts may be made by those skilled in the art without departing from the spirit of my invention.

I claim:

1. An agricultural implement, comprising a pair of ridge forming scrapers and disk ridging members mounted adjacent thereto and side scrapers adapted to be actuated to form cross ridges.

2. An agricultural implement, comprising a pair of converging side boards adapted to form a ridge when drawn over the soil, a pair of disk ridging members, means for swinging said disk members horizontally and locking them in a canted position, and a pair of blocking scrapers positioned upon the opposite sides of side boards, and means whereby said blocking scrapers may be optionally actuated to form cross ridges.

3. A ridging and blocking implement, comprising a pair of vertically extending side boards arranged at an angle to each other and adapted to converge adjacent the rear end of said implement, each of said side boards being formed with upwardly beveled lower edges whereby a ridge of soil may be shaped, a pair of vertically supported ridging disks mounted adjacent the forward ends of said side boards, means whereby said disks may be swung upon their vertical axes in a horizontal plane to assist in the ridging operation, means for adjustably maintaining said disks in a desired angular relation to each other, a pair of blocking scrapers pivotally mounted for horizontal movement and disposed one on each side of said implement, and means whereby said scrapers may be swung downwardly in a manner to drag the soil across and obstruct ditches at angles to the ditch being formed.

In testimony whereof I have signed my name to this specification.

CLAYTON F. WYATT.

Copies of this patent may be obtained for five cents each, by addressing the "Commissioner of Patents, Washington, D. C."